United States Patent [19]

Farge et al.

[11] 3,917,611
[45] Nov. 4, 1975

[54] 1,4-ETHANO-2,3 DIHYDROQUINOLINE DERIVATIVES

[75] Inventors: Daniel Farge, Thiais; Mayer Naoum Messer, Bievres; Daniel Reisdorf, Thiais, all of France

[73] Assignee: Rhone-Poulenc, S.A., Paris, France

[22] Filed: July 30, 1973

[21] Appl. No.: 383,508

[30] Foreign Application Priority Data
Aug. 1, 1972  France .............................. 72.27741

[52] U.S. Cl........... 260/288 R; 260/287 R; 260/288
[58] Field of Search ..................... 260/288 R, 288 A

[56] References Cited
OTHER PUBLICATIONS

Mikhlina et al., "Chem. Abstracts," Vol. 76, Abst. No. 14300d, (1972).

*Primary Examiner*—Donald G. Daus
*Assistant Examiner*—D. B. Springer
*Attorney, Agent, or Firm*—Stevens, Davis, Miller & Mosher

[57] ABSTRACT

4-Amino-1,4-ethano-2,3-dihydroquinoline and 4-methylamino-1,4-ethano-2,3-dihydroquinoline, which are new compounds, possess useful analgesic properties.

2 Claims, No Drawings

1,4-ETHANO-2,3 DIHYDROQUINOLINE DERIVATIVES

This invention relates to new therapeutically useful 1,4-ethano-2,3-dihydroquinoline derivatives, to processes for their preparation and pharmaceutical compositions containing them.

The new 1,4-ethano-2,3-dihydroquinoline derivatives of the present invention are those of the formula:

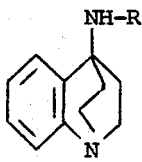

I wherein R represents a hydrogen atom or the methyl radical, and acid addition salts thereof.

According to a feature of the invention, the compound of formula I wherein R represents a hydrogen atom, i.e., 4-amino-1,4-ethano-2,3-dihydroquinoline, is prepared from 4-carboxy-1,4-ethano-2,3-dihydroquinoline of the formula:

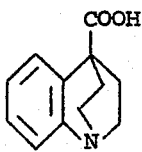

II or a derivative thereof, such as the amide or an acid halide or an alkyl ester containing 1 to 4 carbon atoms in the alkyl radical, by methods known per se for converting a carboxy, carbamoyl, halogenocarbonyl or alkoxycarbonyl radical into the amino radical without affecting the 1,4-ethano-2,3-dihydroquinoline group. By the term "methods known per se" as used in this specification is meant methods heretofore used or described in the chemical literature.

More particularly, 4-amino-1,4-ethano-2,3-dihydroquinoline can be prepared from a. the amide of the acid of formula II by the Hofmann reaction involving heating the amide in the presence of bromine (or chlorine) in an alkaline medium, or b. a halide or an alkyl ester of the acid of formula II by the Curtius reaction involving the preparation of the azide as intermediate, or the Losser reaction involving the preparation of the hydroxamic acid derivative as intermediate, or c. the acid of formula II by the Schmidt reaction involving initally treatment of the acid with hydrazoic acid ($N_3H$).

Alkyl esters of the acid of formula II can be prepared by reacting a 1,2-dihalogenoethane e.g., 1,2-dibromoethane, with a 1,2,3,4-tetrahydroquinoline derivative of the formula:

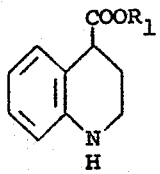

III (wherein $R_1$ represents an alkyl radical containing 1 to 4 carbon atoms) which has been treated beforehand with a lithium dialkylamide in a mixture of benzene and hexamethylphosphotriamide.

The alkyl esters of 4-carboxy-1,4-ethano-2,3 -dihydroquinoline thus obtained can be converted into the acid, amide or an acid halide by methods known per se.

The 4-alkoxycarbonyl-1,2,3,4-tetrahydroquinoline compounds of formula III can be prepared in accordance with the method of A.D. Yanina et al, Khim. Farm, Zh., 3, 7 (1969) [Chem. Abstr., 72, 12514 (1970)].

According to another feature of the invention, the compound of formual I wherein R represents the methyl radical, i.e. 4-methylamino-1,4-ethano-2,3-dihydroquinoline, is prepared by reducing 4-formamido-1,4-ethano-2,3-dihydroquinoline of the formula:

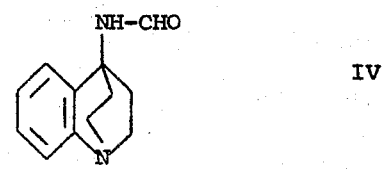

by methods known per se for the reduction of the formamido radical to the methylamino radical without affecting the 1,4-ethano-2,3-dihydroquinoline group. Preferably lithium aluminium hydride is used as the reducing agent and the reaction is carried out in an inert organic solvent such as an ether, e.g., diethyl ether or tetrahydrofuran, or an aromatic hydrocarbon, e.g. benzene, or a mixture of such solvents.

The compound of formula IV can be obtained by formylation by methods known per se of 4-amino-1,4-ethano-2,3-dihydroquinoline (prepared as hereinbefore described). Generally formic acid in the presence of acetic anhydride at a temperature between 30° and 80°C. is used for the formylation.

The compounds of formula I obtained by the aforementioned processes can be purified by physical methods or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The 1,4-ethano-2,3-dihydroquinoline derivatives of formula I may be converted by methods known per se into acid addition salts. The acid addition salts may be obtained by the action of acids on the dihydroquinoline derivatives in appropriate solvents. As organic solvents there may be used alcohols, ketones, ethers or chlorinated hydrocarbons. The salt which is formed is precipitated, if necessary after concentration of the solution, and is isolated by filtration or decantation.

The 1,4-ethano-2,3-dihydroquinoline derivatives of the present invention and their acid addition salts possess analgesic properties coupled with a low toxicity.

In the laboratory, using rats, in the technique of A. d'Amour and D. Smith [J. Pharmacol., 72, 74 (1941)] and in the technique of A. La Belle and R. Tislow [J. Pharmacol., 98, 19 (1950)], the compound of the formula I wherein R represents a hydrogen atom and its acid addition salts have shown analgesic activity at doses of the order of 60 mg./kg. animal body weight (hereinafter abbreviated to "a.b.w"), when administered subcutaneously and of the order of 100 to 150 mg./kg. (a.b.w.) when administered orally, and the compound of the formula I wherein R represents the methyl radical and its acid addition salts have shown analgesic activity at doses of the order of 20 to 30 mg./kg. (a.b.w.) when administered subcutaneously and of the order of 20 to 50 mg./kg. (a.b.w.) when administered orally.

In the laboratory, using mice, in the technique of E. Siegmund et al [Proc. Soc. Exp. Biol. Med., 95, 729 (1957)], the compound of the formula I wherein R represents a hydrogen atom and its acid addition salts have shown analgesic activity at doses of 1 to 2 mg./kg. (a.b.w.) when administered subcutaneously and 5 to 10 mg./kg. (a.b.w.) when administered orally, and the compound of the formula I wherein R represents the methyl radical and its acid addition salts have shown analgesic activity at doses of 0.1 to 1 mg./kg. (a.b.w.) when administered subcutaneously and 2 to 10 mg./kg. (a.b.w.) when administered orally.

In the case of the new 1,4-ethano-2,3-dihydroquinoline derivatives, the ratio between the active doses administered orally and the active doses administered subcutaneously is generally markedly lower than in the case, for example, of morphine, so that the new compounds, which — when administered subcutaneously — are less active than morphine, exert an activity similar to that of morphine or greater than that of morphine when administered orally. The value of the new compounds resides essentially in the fact that their activity when administered orally is not much lower than their activity when administered subcutaneously, and this renders them utilisable by oral administration.

For therapeutic purposes, the 1,4-ethano-dihydroquinoline derivatives of general formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllineacetates, salicylates, phenolphthalinates and methylene-bis-$\beta$-hydroxynaphthoates) so that the beneficial physiological properties inherent in the bases are not vitiated by side-effects ascribable to the anions.

The following Examples illustrate the invention.

EXAMPLE 1

Bromine (110 g.) is added, over a period of thirty minutes, to a solution of sodium hydroxide ($d = 1.33$; 369 cc.) in water (860 cc.) at between 0° and 3°C. The solution is stirred at 0°C. for thirty minutes and then 4-carbamoyl-1,4-ethano-2,3-dihydroquinoline (135.5 g.) is added. The mixture is stirred at 20°C. until dissolution, and the solution is then heated at 60°C. until an exothermic reaction starts. The solution is left for ten minutes at between 65° and 70°C. and is then heated at 75°C. for thirty minutes. A small amount of insoluble matter is filtered off and the filtrate is then saturated with potassium carbonate (1 kg.) and extracted with methylene chloride (1.2 litres). The organic solution is dried over anhydrous potassium carbonate and then concentrated to dryness under reduced pressure (25 mm.Hg). An orange-yellow oil (78 g.) is thus obtained and is dissolved in a mixture of ethanol (310 cc.) and diethyl ether (150 cc.) into which hydrogen chloride gas is bubbled. 4-Amino-1,4-ethano-2,3-dihydroquinoline dihydrochloride (97.5 g.), which decomposes at about 260°C., is thus obtained.

4-Carbamoyl-1,4-ethano-2,3-dihydroquinoline can be prepared in the following way:

4-Chloroformyl-1,4-ethano-2,3-dihydroquinoline hydrochloride (354 g.) is added over a period of five minutes to concentrated ammonia ($d = 0.84$; 1 litre) at 10°C. The mixture is stirred for three hours at 20°C. Water (800 cc.) is added and the precipitate is filtered off. The wet solid is recrystallised from acetonitrile (1.5 litres) in the presence of decolourising charcoal (5 g.). On filtering and washing with acetonitrile (100 cc.), 4-carbamoyl-1,4-ethano-2,3-dihydroquinoline (240 g.), which melts at 220°C., is isolated.

The mother liquors are concentrated under reduced pressure (25 mm.Hg) and more 4-carbamoyl-1,4-ethano-2,3-dihydroquinoline (31 g.), which melts at 220°C., is isolated by filtering and washing with diisopropyl ether (150 cc.).

4-Chloroformyl-1,4-ethano-2,3-dihydroquinoline hydrochloride can be prepared in the following way:

4-Carboxy-1,4-ethano-2,3-dihydroquinoline hydrochloride (328 g.), benzene (4 litres) and thionyl chloride (975 cc.) are heated under reflux for fifteen hours. The liquid phase is removed by decanting and the precipitate is washed with benzene (1 litre). The crude precipitate thus obtained is used directly.

4-Carboxy-1,4-ethano-2,3-dihydroquinoline hydrochloride can be prepared in the following way:

4-Ethoxycarbonyl-1,4-ethano-2,3-dihydroquinoline hydrochloride (329 g.) in ethanol (3.4 litres) is heated under reflux. A 4N aqueous solution of sodium hydroxide (650 cc.) is then added over a period of thirty minutes to the boiling solution. The mixture is heated under reflux for four hours and is then concentrated to dryness under reduced pressure (25 mm.Hg). The residue is taken up in 6N hydrochloric acid (600 cc.). The mixture is heated under reflux and water (300 cc.) is added until dissolution. The solution is treated with decolourising charcoal (5 g.) and is then filtered. On recrystallisation followed by filtration and drying in air, 4-carboxy-1,4-ethano-2,3-dihydroquinoline hydrochloride (187 g.), which decomposes at about 250°C., is isolated.

The mother liquors are concentrated to 250 cc. After filtration, a mixture of 4-carboxy-1,4-ethano-2,3-dihydroquinoline hydrochloride (97 g.) and sodium chloride (108 g.) is isolated.

The two precipitates are combined and are used directly without purification.

4-Ethoxycarbonyl-1,4-ethano-2,3-dihydroquinoline hydrochloride can be prepared in the following way:

Lithium (14 g.), hexamethylphosphotriamide (500 cc.), benzene (500 cc.) and diethylamine (146 g.) are stirred under an inert atmosphere (preferably nitrogen or argon), at between 0° and 20°C., for twenty hours until the metal has disappeared. The brown-red mixture is cooled to 0°C. and then, at between 0° and 3°C., 4-ethoxycarbonyl-1,2,3,4-tetrahydroquinoline (205 g.) dissolved in diethyl ether (250 cc.) is run in over a period of one hour and thirty minutes.

After the end of the addition, the mixture is stirred for thirty minutes at 0°C. and then, with the temperature initially at −20°C., 1,2-dibromoethane (188 g.) is added over a period of five minutes. The temperature must not exceed 15°C. The solution is stirred for a further hour at ambient temperature and is then poured into water (1.3 litres) at 5°C.

The organic phase is decanted and the aqueous phase is extracted with cyclohexane (4 litres). The organic extracts are washed with water (4 litres) and dried over anhydrous sodium sulphate. After filtration and concentration under reduced pressure (25 mm.Hg), an orange-red oil (192.5 g.) is isolated. This oil is dissolved in methylene chloride (200 cc.) and chromatographed on alumina (800 g.). Elution is carried out with methylene chloride (3 litres) and, after concentration under reduced pressure (25 mm.Hg), an orange-yellow oil (160 g.) is isolated. This oil is dissolved in a mixture of ethanol (350 cc.) and diethyl ether (100 cc.) into which hydrogen chloride gas is bubbled. On filtration, 4-ethoxycarbonyl-1,4-ethano-2,3-dihydroquinoline hydrochloride (65 g.), which decomposes at about 260°C., is isolated.

4-Ethoxycarbonyl-1,2,3,4-tetrahydroquinoline can be prepared according to Yanina A.D., Mikhlina E.E., Zaitseva K.A.; Mashkovskii M.D. and Yakhontov L.N., Kim. Farm, Zh., 3 (8), 7-11 (1969); [C.A., 72 12514v (1970)].

EXAMPLE 2

4-Formamido-1,4-ethano-2,3-dihydroquinoline (32.5 g.) in a mixture of benzene (322 cc.) and tetrahydrofuran (460 cc.) containing lithium aluminium hydride (39 g.) is heated under reflux for 28 hours in an atmosphere of nitrogen. The reaction mixture is then hydrolysed at 0°C. by successively adding water (14 cc.), 4N sodium hydroxide solution (14 cc.) and finally water (70 cc.) until the evolution of gas ceases. The insoluble matter is filtered off and then washed with methylene chloride (1 litre). The organic solution is dried over anhydrous potassium carbonate and then concentrated to dryness under reduced pressure (25 mm.Hg). 4-Methylamino-1,4-ethano-2,3-dihydroquinoline (28 g.), which melts at 76°C., is thus obtained.

4-Formamido-1,4-ethano-2,3-dihydroquinoline can be prepared in the following way:

Acetic anhydride (134.5 cc.) is added over a period of 35 minutes to a solution of 4-amino-1,4-ethano-2,3-dihydroquinoline (28.2 g.) in 98% formic acid (405 cc.). The reaction is exothermic. The mixture obtained is then heated gradually to 60°C. and is kept at this temperature for one hour. The organic solution is concentrated under reduced pressure (25 mm.Hg). The residue is treated at 0°C. with a 4N solution of sodium hydroxide until a ph of about 12 is obtained. The mixture is extracted with methylene chloride (400 cc.). The organic extracts are washed with water (100 cc.) and then dried over anhydrous sodium sulphate. After filtration and concentration under reduced pressure (25 mm.Hg), 4-formamido-1,4-ethano-2,3-dihydroquinoline (32.5 g.), which melts at 165°C., is isolated.

The present invention includes within its scope pharmaceutical compositions which comprise, as active ingredient, at least one of the 1,4-ethano-2,3-dihydroquinoline derivatives of formula I, or a nontoxic acid addition salt thereof, in association with a pharmaceutical carrier or coating. The invention includes especially such preparations made up for oral, parenteral or rectal administration. Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, e.g., lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment.

The composition can be used in the treatment of thoracic and abdominal pains, pains of vascular origin, rheumatic pains and post-operative and cancerous pains. In human therapy the compositions when administered orally to an adult should generally give doses between 50 mg. and 200 mg. of active substance per day. In general, the physician will decide the posology considered appropriate, taking into account the age and weight and other factors intrinsic to the patient being treated.

The following Example illustrates pharmaceutical compositions according to the invention.

EXAMPLE 3

A solution having the following composition is prepared:

| | |
|---|---|
| 4-amino-1,4-ethano-2,3-dihydroquinoline dihydrochloride | 28.4 g. |
| injectable solution | q.s. 500 cc. |

This solution is sterilised by filtering through a bacteria-retaining filter and is then divided into ampoules at the rate of 5 cc. per ampoule. The ampoules are sealed. Ampoules containing 0.2 g. of active substance are thus obtained.

EXAMPLE 4

A solution having the following composition is prepared:

| | |
|---|---|
| 4-methylamino-1,4-ethano-2,3-dihydroquinoline | 20 g. |
| injectable solution | q.s. 500 cc. |

This solution is sterilised by filtration through a bacteria-retaining filter and is then divided into ampoules at the rate of 5 cc. per ampoule. The ampoules are sealed. Ampoules containing 0.2 g. of active substance are thus obtained.

EXAMPLE 5

Tablets, which contain 100 mg. of active substance, and having the following composition are prepared in accordance with the usual technique:

| | |
|---|---|
| 4-methylamino-1,4-ethano-2,3-dihydroquinoline | 100 mg. |
| starch | 115 mg. |
| colloidal silica | 30 mg. |
| magnesium stearate | 5 mg. |

We claim:
1. A 1,4-ethano-2,3-dihydroquinoline of the formula:

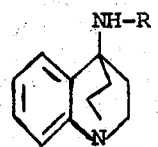

wherein R represents hydrogen or methyl, and pharmaceutically-acceptable non-toxic acid addition salts thereof.

2. The 2,3-dihydroquinoline according to claim 1 which is 4-amino-1,4-ethano-2,3-dihydroquinoline, and pharmaceutically-acceptable non-toxic acid addition salts thereof.

* * * * *

UNITED STATES PATENT AND TRADEMARK OFFICE
CERTIFICATE OF CORRECTION

PATENT NO. : 3,917,611
DATED : November 4, 1975
INVENTOR(S) : Daniel FARGE et al It is certified that error appears in the above-identified patent and that said Letters Patent are hereby corrected as shown below:

Under the heading, "Foreign Application Priority Data", after "Aug. 1, 1972　　France......72.27741" insert --Dec. 28, 1972　　France......72.46610--.

Signed and Sealed this twenty-third Day of March 1976

[SEAL]

Attest:

RUTH C. MASON
*Attesting Officer*

C. MARSHALL DANN
*Commissioner of Patents and Trademarks*